(12) United States Patent
Pohl et al.

(10) Patent No.: US 8,374,983 B1
(45) Date of Patent: Feb. 12, 2013

(54) DISTRIBUTED OBJECT CLASSIFICATION

(75) Inventors: Michael Pohl, Pittsburgh, PA (US);
Chris Kirby, Edgeworth, PA (US);
Yunkai Zhou, Sewickley, PA (US);
Vinay Chaudhary, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 554 days.

(21) Appl. No.: 12/624,000

(22) Filed: Nov. 23, 2009

(51) Int. Cl.
*G06E 1/00* (2006.01)

(52) U.S. Cl. .......................................... 706/46

(58) Field of Classification Search .................. None
See application file for complete search history.

(56) References Cited

U.S. PATENT DOCUMENTS

| | | | | |
|---|---|---|---|---|
| 7,287,274 | B1* | 10/2007 | Houlding | 726/11 |
| 2005/0235011 | A1 | 10/2005 | Minium et al. | |
| 2007/0112840 | A1* | 5/2007 | Carson et al. | 707/102 |
| 2007/0239701 | A1* | 10/2007 | Blackman et al. | 707/5 |
| 2008/0028067 | A1* | 1/2008 | Berkhin et al. | 709/224 |
| 2008/0154668 | A1* | 6/2008 | Kuo et al. | 705/7 |

* cited by examiner

*Primary Examiner* — Kakali Chaki
*Assistant Examiner* — Walter Hanchak
(74) *Attorney, Agent, or Firm* — Fish & Richardson P.C.

(57) ABSTRACT

Methods, systems, and apparatus, including computer programs encoded on a computer storage medium, for classifying objects. Object (e.g., Website) classification can be performed using multiple models that are implemented in a distributed processing environment. In response to receiving a request to classify an object based on attribute values that characterize the object models that are configured to classify objects based on the attribute values are identified and the attribute values are provided to the identified models. Based on classification data received from selected models is used to generate a final classification for the object. The final classification can specify or correspond to a presentation availability status of the object that can be used to control availability of the object. For example, a Website having a final classification of "blacklisted" can be made unavailable for presentation based on the classification result.

23 Claims, 5 Drawing Sheets

DISTRIBUTED OBJECT CLASSIFICATION

BACKGROUND

This specification relates to data processing techniques such as data mining.

Data mining is used, for example, to identify attributes of a dataset that are indicative of a particular result and to predict future results based on the identified attributes. As the number of records in a dataset increase, combinations of attributes and attribute values may be used to predict future results. Therefore, the combinations of attributes and attribute values that are indicative of future results can become more complex, such that machine learning techniques may be used to identify combinations of attributes and attribute values that facilitate computation of predicted results.

Machine learning algorithms generate models based on the combinations of attribute values that are identified to be indicative of a specified result. For example, support vector machines generate a hyperplane that maximizes the distance between data records that are identified as belonging to a specified category and data records that are identified as not belonging to the category. The resulting hyperplane can be used to generate a model including a vector of weights, where each weight corresponds to attributes of the data records. In turn, dot products of the vector of weights and attribute values of input data records are used to classify the input data records as belonging or not belonging to the category for which the model was generated.

Decision trees are another machine learning algorithm that can be used to classify data records. Decision trees group a dataset into subsets of records based on the attributes and corresponding attribute values of the dataset. The full dataset and each of the subsets of records are represented by nodes. The nodes representing the dataset and each of the subsets of records can be connected by links that are referred to as branches. The nodes are connected in a hierarchical manner such that a predicted result (e.g., predicted classification) for input data is computed based on sets of rules (i.e., split-points) that define the sets of records that are represented by the nodes. In turn, a node that represents records that have attribute values similar to the input data can be identified from the decision tree and the result corresponding to the identified node can be defined as the predicted result for the input data. Thus, input data records can be classified by identifying nodes that represent the input data records and classifying the data records based on the predicted result corresponding to the node.

Multiple models can be trained to classify a data record based on different input attribute values. Similarly, multiple models can be trained to classify the data record to different categories based on the same and/or different sets of input attribute values. Therefore, multiple classifications may exist for a single data record when multiple models are used to classify the data record.

SUMMARY

A model integration system facilitates classification of objects (e.g., Websites) using multiple models that are implemented in a distributed processing environment. The model integration system receives a request to classify an object based on attribute values that characterize the object. In response to the request, the model integration system identifies models that are configured to classify objects based on the attribute values and provides the attribute values to the identified models.

The model integration system receives classification data from a selected model and generates a final classification for the object based on the classification data. The final classification can specify or correspond to a presentation availability status of the object that can be used to control availability of the object. For example, a Website having a final classification of "blacklisted" can be made unavailable for presentation based on the classification result.

In general, one aspect of the described subject matter can be implemented in methods that begin by receiving a request to classify an object, where the request includes at least one attribute value representing a characteristic of the object. In response to the request, models that are configured to classify the object based on the attribute value are selected. The models can be selected from a set of models implemented in processing devices in a distributed processing environment. The attribute value is provided to the selected models and classification data is received from the selected models. In turn, a final classification is assigned to the object based on the classification data, where the final classification specifies a presentation availability of the object. Other implementations of this aspect include corresponding systems, apparatus, and computer programs configured to perform the actions of the methods and encoded on computer storage devices.

Implementations may include one or more of the following features. For example, the method can further include the actions of identifying additional attribute values that are requested by the selected models; receiving the additional attribute values for the object; and providing the additional attribute values to the selected models. Only the additional attribute values requested by each selected model can be provided to the model. The method can also prevent presentation of the object based on the final classification.

The object can be a Website for an advertiser that is referenced in online advertisements. The classification data received can include a classification score and a confidence factor, where the classification score is indicative of an initial classification of the object and the confidence factor specifies a likelihood that the initial classification of the object is accurate.

The final classification can be assigned to the object by selecting an initial classification of the object based on the classification score satisfying a threshold classification score corresponding to the initial classification, comparing the confidence factor to a threshold confidence factor corresponding to the initial classification, and assigning the initial classification to be the final classification in response to the confidence factor meeting the threshold confidence factor.

The method can further include actions that determine a blacklist rate for each model in the set of models, where the blacklist rate provides a rate at which Websites are classified as blacklisted based on classification data provided by the model relative to a total number of Websites for which classification data has been provided by the model. In turn, a model having a blacklist rate that exceeds a threshold blacklist rate can be disabled.

Particular implementations can realize one or more of the following advantages. For example, multiple models independently created and/or maintained throughout a distributed processing environment may be used to classify a data record. Data flow to/from multiple models in a distributed processing environment is centrally managed by a model integration system that receives and provides data for all of the models. Models that are trained to classify a data record based on available attribute values can be selected from an indexed set of models in a distributed processing environment. A final classification for a data record can be selected based on aggregate classification data from multiple models in a distributed processing environment.

The details of one or more implementations are set forth in the accompanying drawings and the description below. Other features and advantages will be apparent from the description, the drawings, and the claims.

BRIEF DESCRIPTION OF THE DRAWINGS

Like reference numbers and designations in the various drawings indicate like elements.

DETAILED DESCRIPTION

Figure 1A:
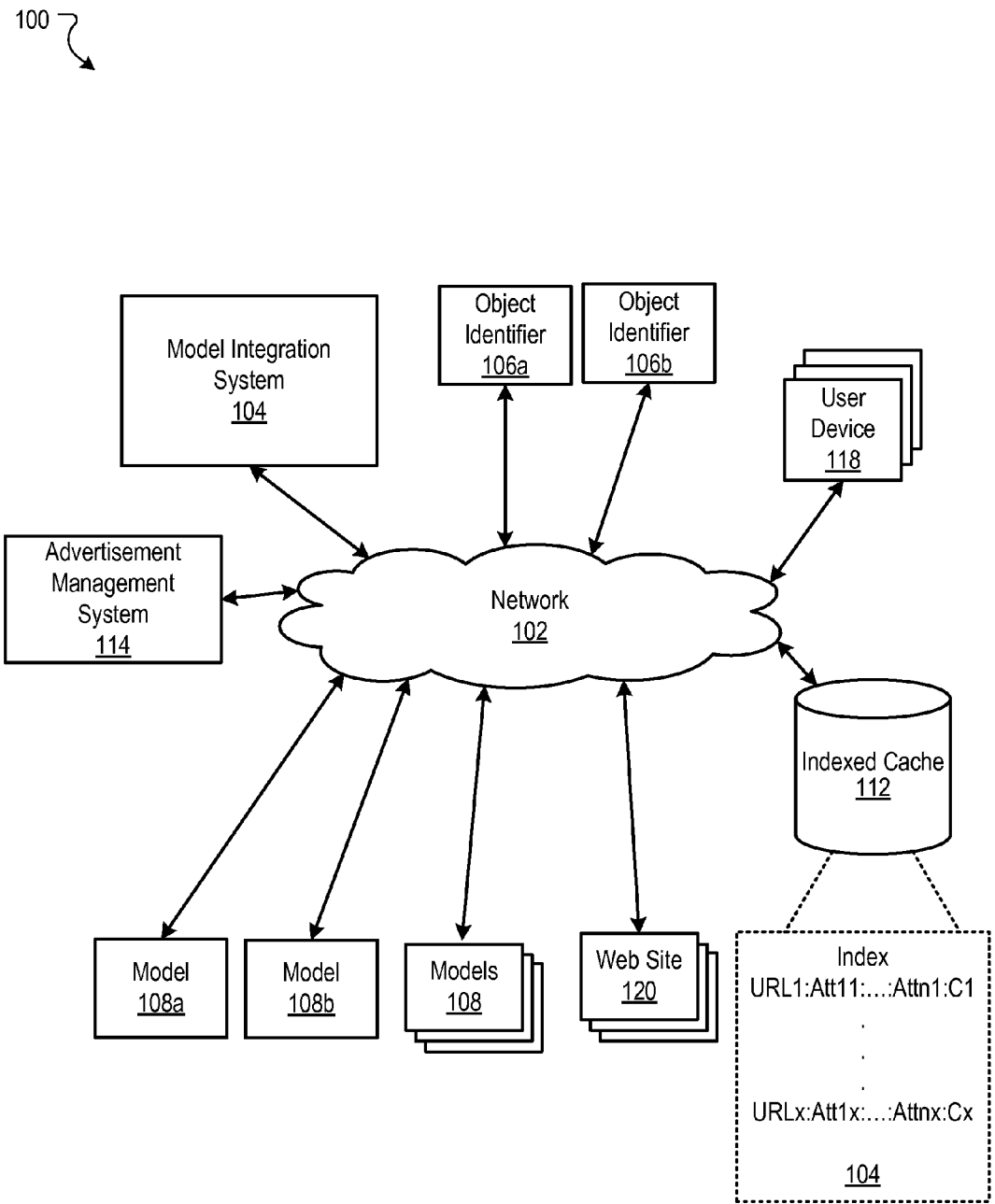
FIG. 1A is a block diagram of an example environment in which a model integration system can be implemented.

A model integration system facilitates classification of objects (e.g., Websites) using multiple models that are implemented in a distributed processing environment. The model integration system receives a request to classify an object based on attribute values that characterize the object. In response to the request, the model integration system identifies models that are configured to classify objects based on the attribute values and provides the attribute values to the identified models.

In some implementations, one or more of the identified models can request or require additional attribute values than those specified in the request. In these implementations, the model integration system can receive the additional attributes, for example, from a datastore in which attribute values for the object are stored and/or indexed. Additionally, the model integration system can initiate a request to receive the additional attributes from an attribute analysis system (e.g., a webcrawler) that can analyze the object and provide the additional attribute values. Once the additional attribute values have been received, the model integration system can provide all of the received attribute values to each selected model, or provide to each selected model only those attribute values that the model requests or requires.

The model integration system receives classification data from the selected models. The classification data includes a classification score and a confidence factor. The classification score is a value received from the model that is used to classify the object. The confidence factor is a measure of the likelihood that the classification score provides an accurate classification of the object. The model integration system generates a final classification for the object based on the classification data, for example, by comparing the classification scores for each of the models to classification thresholds for the models and determining whether the confidence factors exceed confidence thresholds for the respective classifications. The final classification can specify or correspond to a presentation availability status of the object. For example, a Website having a final classification of "blacklisted" can be made unavailable for presentation based on the classification result.

The model integration system is described throughout this document as being implemented as an independent data processing system. However, the model integration system can be implemented as a subsystem of another data processing system. Additionally, the model integration system is described with reference to classifying advertiser Websites, but the model integration system can be implemented to classify other objects based on attributes of the objects other than those described below.

FIG. 1 is a block diagram of an example environment 100 in which a model integration system 104 can be implemented. The environment 100 includes a network 102, such as a local area network (LAN), a wide area network (WAN), the Internet, or a combination thereof. The network 102 connects the model integration system 104, object identifiers 106, models 108, web pages 110 and an indexed cache 112. In some implementations, the network 102 also connects an advertisement management system 114, advertisers 116, user devices 118 and Websites 120.

A Website 120 includes one or more resources associated with a domain name and hosted by one or more servers. An example Website is a collection of Web pages formatted in hypertext markup language (HTML) that can contain text, images, multimedia content, and programming elements, e.g., scripts. Each Website 120 is maintained by a publisher, e.g., an entity that manages and/or owns the Website 120.

A resource is any data that can be provided by the Website 120 over the network 102 and that is associated with a resource address. Resources include HTML pages, word processing documents, and portable document format (PDF) documents, images, video, and feed sources, to name only a few. The resources can include content, e.g., words, phrases, images and sounds that may include embedded information (such as meta-information in hyperlinks) and/or embedded instructions (such as JavaScript scripts).

A user device 118 is an electronic device that is under control of a user and is capable of requesting and receiving resources over the network 102. Example user devices 118 include personal computers, mobile communication devices, and other devices that can send and receive data over the network 102. A user device 118 typically includes a user application, such as a web browser, to facilitate the sending and receiving of data over the network 102.

A user device 118 can request a resource from a Website 120. In turn, data representing the resource can be provided for presentation by the user device 118. The data representing the resource can also include data specifying a portion of the resource or a portion of a user display (e.g., a presentation location of a pop-up window) in which advertisements can be presented. These specified portions of the resource or user display are referred to as advertisement slots.

Characteristics of the advertisements slots can be provided to the advertisement management system 114 to facilitate selection of advertisements for presentation in the advertisement slots. For example, a reference (e.g., URL) to the resource for which the advertisement slot is defined, a size of the advertisement slot, and/or media types that are available for presentation in the advertisement slot can be provided to the advertisement management system 114. In turn, the advertisement management system 114 can select advertisements for presentation in advertisement slots based on the advertisements having characteristics that match the characteristics of the advertisement slot.

When a resource is requested by a user device 118, the advertisement management system 114 receives a request for advertisements to be provided with the resource. In response to the request, the advertisement management system 114 obtains characteristics of the advertisement slot for the resource and selects advertisements to be provided with the resource. The characteristics of the advertisement slots can be included in the request, or received from an indexed cache 112.

The indexed cache 112 is a datastore (i.e., computer storage device) storing an indexed set of Website attribute values. For example, the indexed cache can include a uniform resource locator ("URL") and corresponding attribute values that represent characteristics of the Websites and are indexed with the URL of the Website. The attribute values (Att11-Attnx) can be stored in the indexed cache 112, for example, by a webcrawler that analyzes Websites and extracts attribute values for the Websites. As described below, the indexed cache 112 can also store classifications of Websites (C1-Cx) that can be used to control presentation of the Websites. The indexed cache 112 can be made available to devices and systems through the network 102.

Advertisements that are presented with resources can include links to Websites that are provided for the advertisers that provided the advertisements. For example, an advertisement for widgets that is provided by a widget manufacturer can include a URL that, when selected, causes presentation of the widget manufacturer's Website. The Website may include more information about the widgets provided by the manufacturer and may enable a user to purchase widgets through the Website.

The links that are provided in the advertisements can provide an opportunity for advertisers to realize sales from selection (i.e., clicks) of their advertisements and increase their return on investment for the advertisements. These links also provide opportunities for users to identify and purchase items that they desire without having to search for a Website. However, when a link in an advertisement directs a user to a Website that reduces the quality of a user's online experience and/or is in violation of advertising policies, it may be beneficial to prevent presentation of the Website referenced by the link. Websites that contain no content or include malicious scripts are examples of Websites that may violate advertising policies and/or reduce the quality of a user's online experience.

In some implementations, Websites that are in violation of advertising policies and/or reduce the quality of a user's online experience can be identified based on characteristics of the Websites. Models 108 can be trained to identify Websites that may reduce the quality of a user's online experience based on the characteristics of the Websites. For example, using a machine learning algorithm, a model can be trained to identify a "blank" Website based on an amount of content (i.e., images, text, and flash) that the Website contains. Similarly, models can be trained to identify Websites that contain malicious scripts or are otherwise undesirable Websites (i.e., Websites that reduce the quality of the users' online experiences) based on combinations of characteristics that are common to undesirable Websites.

Because there are different characteristics that may make a Website undesirable, different models can be trained to classify Websites relative to the different characteristics. For example, one model (e.g., 108a) may identify "blank" Websites based on the amount of content of the Website. Another model (e.g., 108b) may identify "malicious" Websites based on unique characteristics associated with Websites that are known to contain malicious scripts, while still other models 108 may identify other categories of undesirable Websites based on other characteristics that are common for Websites that are known to belong to the other categories.

The advertisement management system 114 can take actions to increase the quality of a user's online experience, for example, by adjusting the availability of an undesirable Website to which advertisements provided by the advertisement management system 114 are linked. For example, undesirable Websites can be flagged for human review and/or "blacklisted," thereby making the Websites unavailable for presentation to a user. A Website can be made unavailable, for example, by deactivating the link to the Website in the advertisement or preventing the advertisement from being provided to user devices 118.

As described above, multiple models 108 can be trained to identify undesirable Websites by identifying the characteristics that are distinctively associated with Websites that are undesirable (e.g., lack of content or malicious scripts). However, each of the models may require a unique set of input attribute values representing characteristics (also referred to as attributes) of the Websites and some models may classify Websites as undesirable based on characteristics that are less undesirable than other characteristics. For example, the Website characteristics needed for a model to identify a "blank" Websites can differ from the characteristics needed for another model to identify a "malicious" Website and a "malicious" Website may be considered more undesirable than a "blank" Website.

Additionally, because the characteristics with which undesirable Websites are identified can change over time and new characteristics can be identified, the models 108 can be periodically updated to identify undesirable Websites based on the changed characteristics and new models 108 can be trained to identify undesirable Websites based on the new characteristics. As the number of models 108 increases, the resources required to identify newly identified characteristics of undesirable Websites, create new models 108, and periodically update the models 108 can increase, thereby making it more difficult for the models to be maintained in a single processing device.

In some implementations, the models 108 can be implemented across multiple processing devices in a distributed processing environment. For example, one or more different models 108 can be trained and maintained in each of the processing devices and connected by the network 102. In these implementations, the complexity of managing the data provided over the network 102 to and from each of the models 108 and determining actions to take in response to classifications increases as the number of models 108 increases.

The complexity of managing the data flow to the models 108 is further increased when multiple object identifiers 106 are requesting classification of Websites. Object identifiers are processing devices that request classification of identified objects and provide characteristics of the identified objects. Each of the object identifiers 106 can be implemented to request classification of a specified group or category of identified objects. For example, the object identifier 106a may be implemented to identify Websites that have not been previously classified by the models 108, while object identifier 106b may be implemented to periodically request an updated classification for previously classified Websites. The object identifiers 106 can also be implemented to request classification for objects irrespective of the status of the object.

The environment 100 includes a model integration system 104, including one or more processors, that manages data flow to/from the models 108 and selects a final classification based on the outputs of the models 108. The model integration system 104 receives classification requests from the object identifiers 106 and identifies attribute values that are included in the requests. Based on the attribute values, the model integration system 104 can identify models 108 that are implemented to classify objects based on the attribute values and determine whether additional attribute values are required by the identified models. For example, if the classification request only includes a uniform resource locator attribute value, the model integration system 104 can identify the models 108 that use a uniform resource locator for classifying a Website and determine the other attribute values that are required by each of the models.

When models 108 require attribute values in addition to those received from the object identifiers, the model integration system 104 receives the additional attribute values from the indexed cache 112 or an attribute analysis system (e.g., a webcrawler) that is implemented to analyze objects and provide attribute values representing the characteristics of the object. For example, attribute values that have been extracted from Websites 120 by a webcrawler can be stored in the indexed cache 112 and associated with the URL of the Website 120. Thus, the attribute values for these crawled Websites can be received from the indexed cache 112. For a Website 120 that has not been crawled, the model integration system 108 can request that the Website 120 be crawled and the attribute values required by the models 108 be provided to the model integration system 104, and/or stored in the indexed cache 112.

The model integration system 104 provides the attribute values (and additional attribute values) to the identified models for classification of the Website. The model integration system 104 can provide all of the attribute values to all of the models, or provide to each model only those attribute values that are required or requested by the model for classification of the object.

The model integration system 104 receives, as output from the models 108, classification data including classification scores and confidence factors. The classification scores are used to classify the Website to one or more categories. The confidence factors for each of the classification scores are compared to threshold confidence factors for the categories to which the Website is classified based on the classification scores. Based on the comparison, the model integration system 104 selects a final classification for the object that, in some implementations, defines the availability of the object.

Figure 1B:
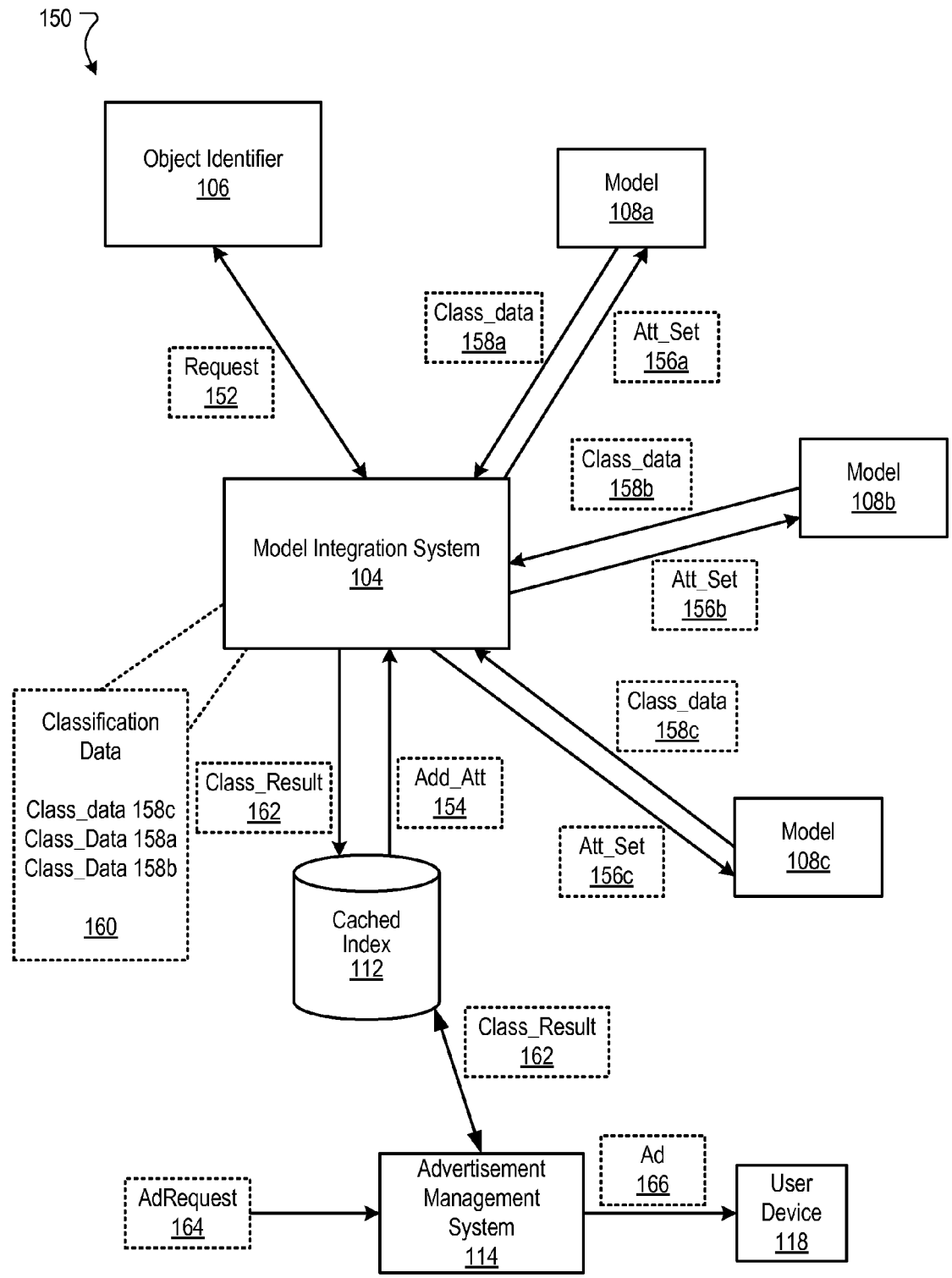
FIG. 1B is a block diagram of example data flows for computing a final classification in a distributed model environment.

FIG. 1B is a block diagram of example data flows 150 for computing a final classification in a distributed model environment. The model integration system 104 receives a request 152 from an object identifier 106 for classification of a Website. The request can include, for example, one or more attribute values that represent characteristics of the Website.

Based on the request, the model integration system 104 identifies models 108a-108c that are trained to classify Websites based, at least in part, on at least one attribute value included in the request 152. The models 108a-108c can be identified, for example, based on an indexed list of models and corresponding attributes with which the models classify Websites. For example, the model integration system 104 can access the indexed list, identify models that are associated with an attribute value that was included with the request, and also determine whether each of the models requests or requires additional attribute values for classifying the Website. If additional attribute values are requested or required, the model integration system 104 receives the additional attribute values 154, for example, from the indexed cache 112.

The model integration system 104 provides attribute sets 156a-156c to the models 108a-108c, respectively. Attribute sets 156a-156c can each include all of the attribute values received by the model integration system 104. For example, model 108a may request attribute values representing the language of the text for the Website and a font size of text for the Website, model 108b may request the language attribute value and an attribute value indicating whether the Website includes explicit material, and model 108c may request the font size attribute value and the explicit material attribute value. In this example, the model integration system 104 can provide the full set of attribute values to each of the models 108a-108c in a single data transfer so that each of the models will receive its requested set of attribute values through the single data transfer. Thus, the data transfer is simplified and the efficiency of the data transfer is increased by not requiring each model to individually request and retrieve its requested set of attribute values.

In some implementations, the model integration system 104 can provide to each of models 108a-108c only those attribute values requested or required by the respective models 108a-108c to which the attribute sets 156a-156c are provided. For example, the language attribute value can be provided to both models 108a and 108b, while the font size attribute value is provided to models 108a and 108c and the explicit content attribute value is provided to models 108b and 108c.

The models 108a-108c generate corresponding classification data 158a-158c and provide the classification data 158a-158c (collectively referred to as classification data 160) to the model integration system 104. The model classification system 104 selects a final classification 162 based on the classification data 160, as described with reference to FIG. 2. The final classification 162 can be stored in the indexed cache 112, for example, at a memory location associated with the Website.

In some implementations, the final classification 162 can specify or correspond to an availability for the Website. For example, the final classification 162 can indicate that a Website is a "blacklisted" Website such that the Website is unavailable for presentation to user devices through an advertisement that links to the Website. Alternatively, the final classification can indicate that the Website is a "manual review" Website indicating that the Website is to be added to a manual review queue to be analyzed, for example, by a human evaluator. In some implementations, manual review Websites can continue to be provided to user devices 118 until manually reviewed. In other implementations, the manual review Websites can be prevented from being provided to user devices 118 until manually reviewed.

The final classification 162 can be used to determine whether the Website is provided to a user device in response to a user selection of an advertisement that includes a link to the Website. Additionally, the final classification 162 can be used to determine whether an advertisement that includes a link to the Website is provided by the advertisement management system 110. For example, the advertisement management system 110 can access the indexed cache 112 or another location at which the final classification 162 is stored to receive the final classification 162 for Websites to which advertisements provided by the advertisement management system 104 are linked.

When the advertisement management system 104 identifies an advertisement that includes a link to a "blacklisted" Website, the advertisement management system 104 can disable or remove the link to the Website from the advertisement. Alternatively, the advertisement management system 104 can prevent the advertisement including the link to the "blacklisted" Website from being presented. For example, in response to an advertisement request 164, the advertisement management system 104 can provide an advertisement 166 that does not include a link to a "blacklisted" Website instead of an advertisement that does include a link to a blacklisted Website.

Figure 2:
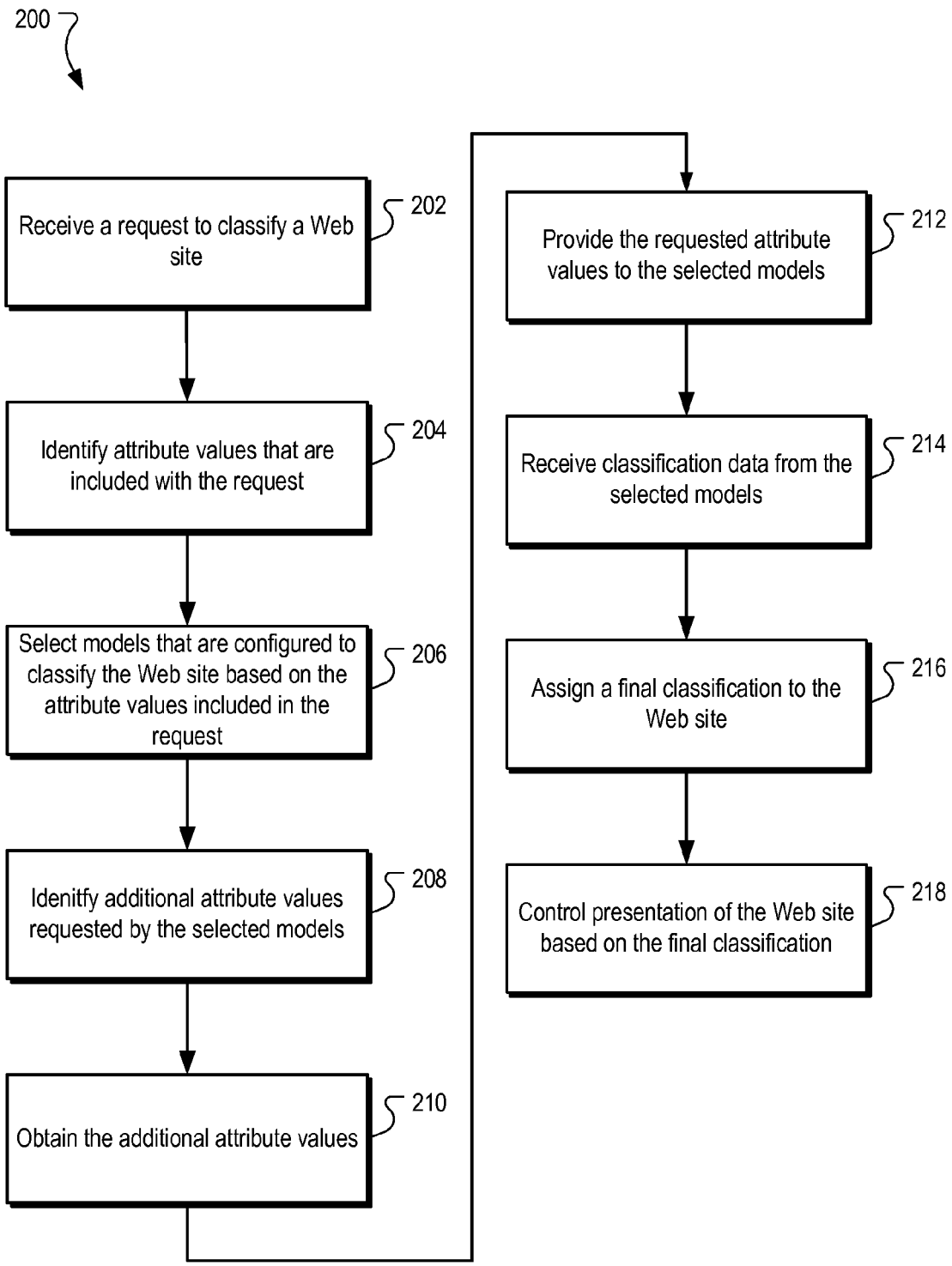
FIG. 2 is a flow chart of an example process for computing final classifications for Websites.

FIG. 2 is a flow chart of an example process 200 for computing final classifications for Websites. The process 200 is a process by which attribute values for a Website are identified from a request to classify a Website and models are selected to classify the Website based on the attribute values. When additional attribute values are requested or required by the selected models, the additional attribute values are received and sets of attribute values are provided to each of the selected models. Classification data are received from the models and a final classification is selected for the Website based on the classification data. In turn, the final classification can be used to prevent presentation of undesirable Websites. The process 200 is described with reference to classifying Websites, but is applicable to classifying other objects.

The process 200 can be implemented, for example, by the model integration system 104 of FIG. 1A. In some implementations, the model integration system 104 includes one or more processors that are configured to perform the operations of the process 200. In other implementations, a computer readable medium can be encoded with instructions that when executed by a computer cause the computer to perform operations of the process 200. The process 200 can be implemented, for example, in a distributed processing environment, such as the environment 100 of FIG. 1A.

A request to classify a Website is received (202). In some implementations, the request includes at least one attribute value representing a characteristic of the Website. For example, a request to classify a Website can include a URL for the Website and/or a content attribute value indicating whether the Website includes any textual or image content.

In some implementations, the request is received from an object identifier that identifies Websites for classification. The object identifiers can be implemented to identify Websites of advertisers that distribute advertisements, for example, through the advertisement management system 114 of FIG. 1A. The Websites for which classification is requested can include newly identified Websites that have not been previously classified and/or Websites for which classification is periodically requested (e.g., weekly, daily, or hourly) to update the classification of the Website.

Attribute values that are included with the request are identified (204). In some implementations, the attribute values are identified based on data that is included with the request. For example, attribute indicators and corresponding attribute values can be included with the request. The attribute indicators can specify, for example, the attribute with which the corresponding attribute value is associated.

Models that are configured to classify the Website based on the attribute values included with the request are selected (206). In some implementations, the models are selected from a set of models that are made available by processing devices of a distributed processing environment. For example, each processing device in a distributed processing environment can make one or more models from the set of models available over a network.

In some implementations, the attribute values with which models are configured to classify Websites can be determined based on an index of the models and corresponding attributes that the models use to classify Websites. For example, a list of models that are available to classify Websites can be indexed by the attribute values with which the models classify Websites. Thus, in response to a request for classification, the attribute values included with the request can be identified in the indexed list of models. In turn, models that are indexed with the received attribute values can be selected to classify the Website.

Additional attribute values that are requested by the selected models are identified (208). Each of the selected models can be configured to classify Websites on additional attribute values other than those included with the request. For example, a particular model may be selected to classify the Website because the model classifies Websites based on the content attribute value. However, the model may also use an explicit content attribute value as well as a language attribute value for classifying Websites.

Each of the attribute values with which a model classifies Websites can be associated with an importance indicator. The importance indicator specifies a measure of importance of the attribute value for accurately classifying a Website. For example, the importance indicator can specify that particular requested attribute values are required for classification of Websites, while other requested attribute values may increase the accuracy with which the model classifies Websites, but are not required to classify a Website.

When the requested attribute values are not included with the request, the additional attribute values are obtained (210). In some implementations, the additional attribute values can be received, for example, from a datastore storing attribute values of Websites. For example, attribute values for Websites that have been analyzed by a webcrawler can be stored in the indexed cache 112 of FIG. 1A. When the requested attribute values are available from a datastore, the attribute values can be received from the datastore, for example, in response to a request for the requested attribute values. When the attribute values are not available from the datastore, for example, because a Website has not been crawled by a webcrawler, a request for the attribute value can be provided to a webcrawler. In turn, the webcrawler can analyze the Website for the requested attribute value and the requested attribute value can be received from the webcrawler.

Some requested attribute values may not be obtainable. For example, a particular model may request an attribute value that is not available from a webcrawler or stored in the datastore. When a requested attribute is not obtainable, a determination can be made as to whether the requested attribute value is required for classification of the Website by the particular model. If the requested attribute is required, the particular model can be removed from the selected models and the process 200 continues with the remaining selected models. If the requested attribute is not required, the process 200 continues with the particular model remaining a selected model.

The requested attribute values are provided to the selected models (212). The requested attribute values that are provided can include the attribute values that were included with the request as well as the additional attribute values that were requested by the models. In some implementations, each selected model is provided only the attribute values that were requested by the model. For example, if a particular model only requests three attribute values, and ten total attribute values are available, the particular model will only receive the three attribute values that it requested. All of the attribute values can also be provided to all of the selected models.

Classification data is received from the selected models (214). In some implementations, the classification data includes a classification score and a confidence factor. The classification score is a value indicative of the initial classification of the Website by the model. For example, the classification score can be a numeric value that can be used to identify a category to which the Website is initially classified. The classification score can also include text that identifies the category to which the Website is initially classified.

The confidence factor is indicative of the likelihood that initial classification of the Website based on the classification score is accurate. For example, the confidence factor can be a numeric value between 0.0 and 1.0, where a confidence factor 0.0 indicates that there is a very small likelihood that a classification of the Website is accurate based on the classification score relative to the likelihood of the classification being accurate when the confidence factor is 1.0. In some implementations, the confidence factor can be based, for example, on an error rate for the model when classifying a test set of Websites having known classifications.

A final classification is assigned to the Website (216). In some implementations, the final classification specifies a presentation availability of the Website. For example, the final classification for a Website can specify that the Website is a blacklisted Website that is unavailable for presentation, a manual review Website that requires manual review and may be conditionally available for presentation pending the manual review, or a whitelisted Website that is available for presentation.

The final classification can be selected, for example, based on the classification scores for the Website and the corresponding confidence factors. For example, a particular classification score for the Website can be used to initially classify the Website as a blacklisted Website. When the confidence factor for the particular classification score exceeds a threshold confidence, a final classification corresponding to a blacklisted Website can be selected. Selecting a final classification for a Website is described in more detail with reference to FIG. 3.

Presentation of the Website is controlled based on the final classification (218). In some implementations, Websites that are identified as blacklisted Websites based on a final classification are prevented from presentation. For example, an advertisement management system that is selecting advertisements for presentation in advertisement slots of a Website can select advertisements that do not include a reference (i.e., link) to blacklisted or manual review Websites. Alternatively, the advertisement management system can deactivate or remove links to blacklisted or manual review Websites from the advertisements distributed by the advertisement management system. Thus, selection of the advertisement will not cause presentation of the blacklisted or manual review Websites. In some implementations, only blacklisted Websites are prevented from being presented, while manual review Websites can continue to be presented pending the manual review.

Figure 3:
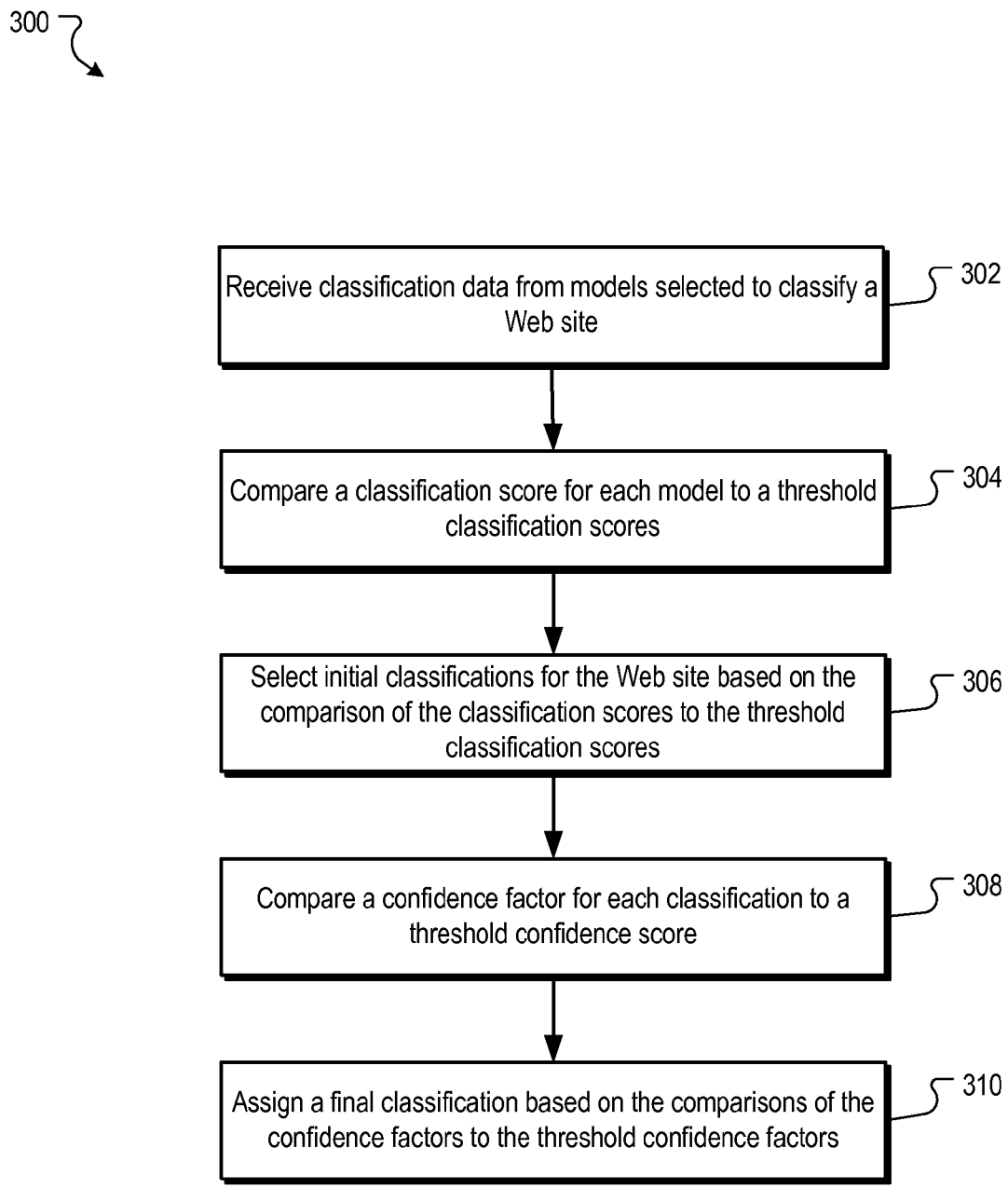
FIG. 3 is a flow chart of an example process for selecting a final classification for a Website.

FIG. 3 is a flow chart of an example process 300 for selecting a final classification for a Website. The process 300 is used to select a final classification based on classification data including classification scores and corresponding confidence factors that are received from models selected to classify a Website. Initial classifications for the Website are selected based on a comparison of the classification scores and model-specific classification thresholds. In turn, the confidence factors corresponding to the classification scores are compared to threshold confidence factors for the initial classifications and a final classification is selected based on the comparison.

The process 300 can be implemented, for example, by the model integration system 104 of FIG. 1A. In some implementations, the model integration system 104 includes one or more processors that are configured to perform the operations of the process 300. In other implementations, a computer readable medium can be encoded with instructions that when executed by a computer cause the computer to perform operations of the process 300. The process 300 can be implemented, for example, in a distributed processing environment, such as the environment 100 of FIG. 1A.

Classification data are received from models that were selected to classify a Website (302). As described above, the classification data can include classification scores and corresponding confidence factors.

The classification scores are compared to threshold classification scores (304). In some implementations, each classification score is compared to a model-specific classification threshold that is used to identify a category to which the Website is initially classified. For example, a classification score of 0.5 provided by one model can be used to initially classify a Website as a blacklisted Website, while another model may require a classification score of 0.8 before the Website is initially classified as a blacklisted Website. Thus, the model-specific classification threshold for the first model can be set to 0.5, while the threshold for the other model can be set to 0.8. Additional thresholds can be set for other categories of Websites, such as the manual review category, in a similar manner.

The model-specific classification thresholds for each model can be provided by the model, or determined, for example, based on classification data for a test set of Websites. For example, attribute values for a set of Websites that belong to known categories (i.e., blacklisted, manual review, and whitelisted) can be provided to the models. Using classification scores that are provided by the models, statistical analysis of the classification scores (or machine learning algorithms using the classification scores as input) can be performed to determine a threshold classification score value at which classifications of the for the model reduces (i.e., minimizes) a classification error rate for the model.

Initial classifications for the Website are selected based on the comparison of the classification scores to the model-specific threshold classification scores (306). In some implementations, an initial classification of blacklisted is selected for each classification score that exceeds the corresponding model-specific classification threshold. The Website can also be initially classified to different Website categories (e.g., blacklisted or manual review) by different models or based on different thresholds for a single model.

For example, one model may be implemented to classify Websites as manual review Websites, while another model may be implemented to classify Websites as blacklisted Websites. Additionally, still another model may classify Websites as blacklisted or manual review based on multiple threshold classification scores. For example, Websites having a classification score between 0.6 and 0.8 might be identified by the model as manual review Websites, while Websites having a classification score greater than 0.8 might be classified as blacklisted Websites.

A confidence factor for each initial classification is compared to a threshold confidence factor (308). The threshold confidence factor can be selected as a minimum confidence factor that is acceptable for each classification category. For example, a different threshold confidence factor can be respectively specified for the blacklisted and manual review classifications.

Classifying a Website as a blacklisted Website (i.e., preventing the Website from being displayed) is an action that may be limited to situations where there is extremely high confidence that the Website will have a large negative effect on the quality of users' online experiences so that desirable Websites are not incorrectly blacklisted. For example, the threshold confidence factor for a Website to be classified as a blacklisted Website can be 0.99 when the maximum confidence factor is 1.0. In this example, a blacklisted classification having a confidence factor of at least 0.99 will satisfy the threshold confidence factor for the blacklisted classification.

In some implementations, the threshold confidence for the manual review classification can be lower than that for the blacklisted classification. For example, when manual review Websites are allowed to continue to be presented in response to selection of an advertisement, there is less risk that a desirable Website will incorrectly be prevented from presentation based solely on the classification. Thus, the confidence factor for classifying a Website as a manual review Website may be set at 0.90 when the maximum confidence factor is 1.0. The manual review threshold can be adjusted, for example, based on resources available to review manual review Websites. For example, when the threshold is lower, more Websites will be placed in the manual review queue and require more reviewers to analyze the Websites than if the threshold is higher.

A final classification is assigned based on the comparisons of the confidence factors to the threshold confidence factors (310). In some implementations, the final classification is selected as the initial classification having a highest satisfied threshold confidence factor. For example, assume that the threshold confidence factors for the blacklisted and manual review classifications are 0.99 and 0.90, respectively. In this example, if an initial classification of blacklisted is based on a classification score having a confidence factor of 0.99, the final classification for the Website will be selected as blacklisted. In this example the final classification will be blacklisted even if there is also an initial classification of manual review from another model having a confidence factor of 0.95 because the threshold confidence factor for blacklisted (0.99) is satisfied and higher than the threshold confidence factor for manual review (0.90).

In the example above, if no initial classifications of blacklisted were based on classification scores having confidence factors of at least 0.99, then the final classification for the Website would not be set to blacklisted. Therefore, the final classification for the Website would be set to manual review, for example, if the Website were initially classified as a manual review Website based on a classification score and the corresponding confidence factor satisfies the threshold confidence factor specified for manual review classifications.

In some implementations, the final classification of a Website can also be set to manual review when an initial classification of blacklisted has a corresponding confidence factor that does not satisfy the threshold confidence factor for the blacklisted classification, but does satisfy the threshold confidence factor for the manual review classification. Continuing with the example above, a Website having an initial classification of blacklisted with a corresponding confidence factor of 0.92 can have a final classification of manual review because the confidence factor of 0.92 exceeds the threshold confidence factor for the manual review classification.

In some implementations, the final classification for a Website is selected to be set to manual review when there is no initial classification requiring a higher confidence factor than the manual review classification.

As described above, new models can be made available in the distributed processing environment and existing models can be adjusted based on newly identified characteristics of undesirable Websites. Therefore, it may be beneficial to monitor the performance of the models that are providing classification data to determine a trust factor for each of the models. The trust factor is a quality measure for a model that is based on an error rate associated with a model. The trust factor can be a value, for example, from 0.0 to 1.0, where higher trust factors are more indicative of higher quality models than lower trust factors.

The trust factor can be based, for example, on a communication error rate (e.g., communication time-out) for the model, a failed classification rate for the model, and/or a blacklist rate for the model (i.e. a number of Websites classified as blacklisted by the model relative to the number of Websites classified by the model). The trust factor can be used, for example, to identify models having an error rate that exceeds a threshold so that the models can be removed from a list of available models and/or an entity maintaining the model can be informed when the trust factor for the model falls below a threshold value.

Figure 4:
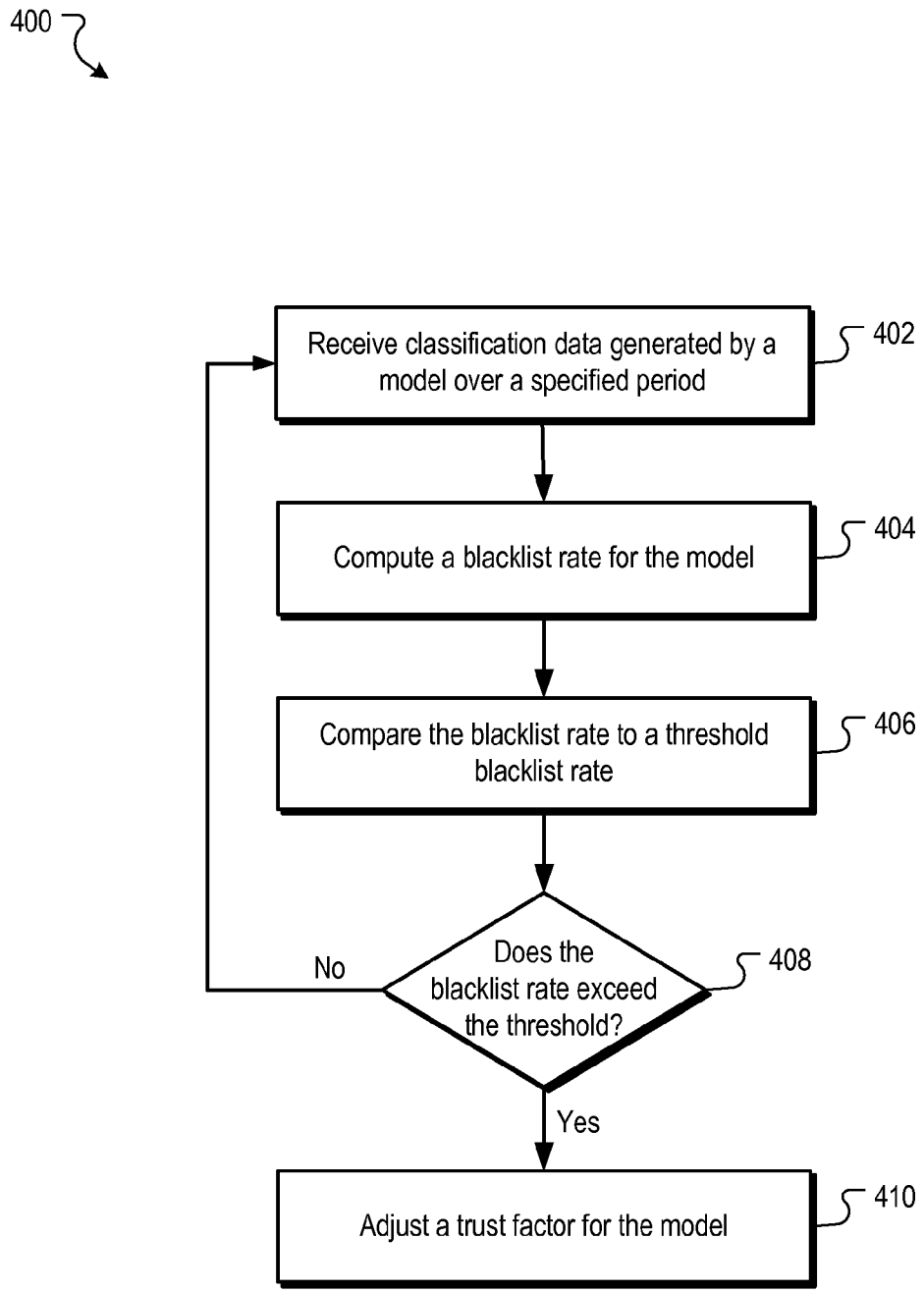
FIG. 4 is a flow chart of an example process for adjusting a trust factor for a model.

FIG. 4 is a flow chart of an example process 400 for adjusting a trust factor for a model. The process 400 is a process by which a blacklist rate for a model is computed based on classification data that is generated by the model over a specified time period. The blacklist rate is compared to a threshold blacklist rate, and if the blacklist rate exceeds the threshold blacklist rate, the trust factor for the model is adjusted to indicate a lower quality measure for the model. While the process 400 is described with reference to a blacklist rate, other measures of quality can be used to adjust the trust factor for a model. For example, a weighted average of a communication error rate, failed classification rate, and the blacklist rate can be used to determine the trust factor for the model.

The process 400 can be implemented, for example, by the model integration system 104 of FIG. 1A. In some implementations, the model integration system 104 includes one or more processors that are configured to perform the operations of the process 400. In other implementations, a computer readable medium can be encoded with instructions that when executed by a computer cause the computer to perform operations of the process 400. The process 400 can be implemented, for example, in a distributed processing environment, such as the environment 100 of FIG. 1A.

Classification data generated by a model over a specified period is received (402). In some implementations, the classification data includes a classification score and a confidence factor. As described above, the classification data can be used to determine a category to which Websites are classified. For example, a Website can be classified as a blacklisted Website when the classification score and confidence factor each satisfy respective thresholds specified for the blacklisted classification.

A blacklist rate is computed for the model (404). In some implementations, the blacklist rate is computed based on the number of Websites having a final classification of blacklisted based on the classification data. For example, the blacklist rate can be a ratio of the number of Websites that are classified as blacklisted Websites based on the classification data relative to the total number of Websites that are classified based on classification data provided by the model. The blacklist rate can be a value between 0.0 and 1.0.

The blacklist rate is compared to a threshold blacklist rate (406). In some implementations, the threshold blacklist rate is a maximum acceptable blacklist rate for a model. For example, the threshold blacklist rate can specify that models that provide classification data that result in a blacklist rate exceeding 0.30 have an unacceptable blacklist rate. The threshold blacklist rate can be determined based on an average blacklist rate of models that are known to provide accurate results or other statistical analysis with which acceptable blacklist rates can be determined.

A determination is made as to whether the blacklist rate exceeds the threshold blacklist rate (408). In some implementations, when the blacklist rate does not exceed the blacklist threshold, classification data for another model is received (402).

When the blacklist rate exceeds the blacklist threshold, the trust factor for the model is adjusted (410). For example, the trust factor for the model can be reduced in response to a determination that the blacklist rate for the model exceeds the threshold blacklist rate. The amount by which the trust factor is reduced can be a specified constant (e.g., 0.1) or proportionate to the amount by which the blacklist rate exceeds the blacklist threshold.

In some implementations, when the trust factor for a model is below a threshold value, the model can be removed from a list of available models or otherwise disabled from providing classification data for Websites. Alternatively, the classification data for the model can continue to be monitored, but not used for selecting final classifications for Websites. By continuing to monitor the final classifications, the classification data can again be used for selecting final classifications when the blacklist rate for the model falls below the blacklist threshold.

When other measures of quality are used to adjust a trust factor of the model, corresponding thresholds for the other measures of quality can be used for adjusting the trust factor of a model in a manner similar to that described above.

The trust factor can also be adjusted based on an error rate of a model identified by a manual review of Websites that are blacklisted based on the classification data provided by the model. For example, a sample of the Websites that are blacklisted based on the classification data can also be added to a manual review queue and reviewed to determine whether the blacklisted classification was correct. In turn, an error rate or other measure of the quality of the model can be computed based on the manual review and the trust factor can be adjusted accordingly.

The functional operations described in this specification can be implemented in digital electronic circuitry, or in computer software, firmware, or hardware, including the structures disclosed in this specification and their structural equivalents, or in combinations of one or more of them. The operations also can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may include a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementations can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims. For example, the actions recited in the claims can be performed in a different order and still achieve desirable results.

What is claimed is:

1. A method performed by data processing apparatus, the method comprising:
   receiving, by a processing device, a request to classify an object, the request including at least one attribute value representing a characteristic of the object;
   determining, by a processing device, that there are two or more different models that are each configured to classify the object based on the at least one attribute value;
   providing, by a processing device, the at least one attribute value to each of the two or more different models;
   identifying, for a particular model among the two or more different models, one or more additional attributes and corresponding additional attribute values;
   providing the identified additional attribute values to the particular model;
   receiving classification data from each of the two or more different models, the classification data received from one of the models specifying, for the object, a different presentation availability than the classification data received from at least one other model among the two or more different models; and
   assigning a final classification to the object based on the classification data received from each of the two or more different models, the final classification specifying a presentation availability of the object.

2. The method of claim 1, further comprising preventing presentation of the object based on the final classification.

3. The method of claim 1, wherein the object is a Website for an advertiser that is referenced in online advertisements.

4. The method of claim 1, wherein:
   the additional attribute values are attribute values that the particular model requires to generate the classification data; and providing the additional attribute values comprises providing, to the particular model, only the additional attributes requested for the particular model.

5. The method of claim 1, wherein receiving classification data comprises receiving, from each of the two or more different models, a classification score and a confidence factor, the classification score received from each of the two or more models being indicative of an initial classification of the object by each of the models, the confidence factor specifying a likelihood that the initial classification of the object by each of the models is accurate.

6. The method of claim 5, wherein assigning a final classification to the object comprises:
   for each of the two or more models:
      selecting an initial classification of the object based on the classification score received from the model satisfying a model-specific threshold classification score corresponding to the initial classification;
      comparing the confidence factor to a threshold confidence factor corresponding to the initial classification; and
   assigning the initial classification from one of the two or more models to be the final classification in response to the confidence factor for the initial classification from the one of the models meeting the threshold confidence factor.

7. The method of claim 6, wherein assigning the initial classification to be the final classification comprises selecting an initial classification corresponding to a highest satisfied threshold confidence factor as the final classification in response to the confidence factor meeting two or more confidence factors corresponding to two or more initial classifications.

8. The method of claim 5, further comprising:
   determining a blacklist rate for each of the two or more different models, the blacklist rate providing a rate at which Websites are classified as blacklisted based on classification data provided by the model relative to a total number of Websites for which classification data has been provided by the model; and
   disabling a model having a blacklist rate that exceeds a threshold blacklist rate.

9. The method of claim 1, wherein receiving a request to classify an object comprises receiving a request to classify a Website of an advertiser for which advertisements are presented with online media.

10. The method of claim 9, wherein the request includes at least a uniform resource locator for the Website.

11. The method of claim 9, wherein receiving a request to classify a Website of an advertiser comprises:
   receiving a periodic request to classify a previously identified Website; and
   receiving a request to classify a newly identified Website.

12. A computer-implemented method, comprising:
   receiving, by a processing device, a request to classify a Website, the request including an identifier associated with the Website;
   requesting, by a processing device, attribute values for the Website, the request including the identifier;
   receiving, by a processing device, the attribute values in response to the request;

selecting, by a processing device, two or more different models that are each configured to classify the Website based on at least one attribute value from the received attribute values, providing, by a processing device, the at least one attribute value to each of the two or more different models;

receiving classification data from the two or more different models, the classification data received from one of the models specifying, for the Website, a different presentation availability than the classification data received from at least one other model among the two or more different models; and assigning a final classification to the Website based on the received classification data, the final classification specifying a presentation availability of the Website.

13. Non-transitory computer storage medium encoded with a computer program, the program comprising instructions that when executed by data processing apparatus cause the data processing apparatus to perform operations comprising:

receiving a request to classify an object, the request including at least one attribute value representing a characteristic of the object;

selecting two or more different models that are each configured to classify the object based on the at least one attribute value;

providing the at least one attribute value to each of the two or more different models;

identifying, for a particular model among the two or more different models, one or more additional attributes and corresponding additional attribute values;

providing the identified additional attribute values to the particular model;

receiving classification data from the two or more selected models, the classification data received from one of the models specifying, for the object, a different presentation availability than the classification data received from at least one other model among the two or more different models; and assigning a final classification to the object based on the received classification data, the final classification specifying a presentation availability of the object.

14. The computer program of claim 13, further comprising instructions that when executed cause the data processing apparatus to perform operations comprising preventing presentation of the object based on the final classification.

15. The computer program of claim 13, wherein receiving classification data comprises receiving, from each of the two or more different models, a classification score and a confidence factor, the classification score received from each of the two or more models being indicative of an initial classification of the object by each of the models, the confidence factor specifying a likelihood that the initial classification of the object by each of the models is accurate.

16. The computer program of claim 15, wherein assigning a final classification to the object comprises:

for each of the two or more models:

selecting an initial classification of the object based on the classification score received from the model satisfying a model-specific threshold classification score corresponding to the initial classification;

comparing the confidence factor to a threshold confidence factor corresponding to the initial classification; and assigning the initial classification from one of the two or more models to be the final classification in response to the confidence factor for the initial classification from the one of the models meeting the threshold confidence factor.

17. The computer program of claim 16, wherein assigning the initial classification to be the final classification comprises assigning an initial classification corresponding to a highest satisfied threshold confidence factor to be the final classification in response to the confidence factor meeting two or more confidence factors corresponding to two or more initial classifications.

18. The computer program of claim 15, further comprising instructions that when executed cause the data processing apparatus to perform operations comprising:

determining a blacklist rate for each of the two or more different models, the blacklist rate providing a rate at which Websites are classified as blacklisted based on classification data provided by the model relative to a total number of Websites for which classification data has been provided by the model; and disabling a model having a blacklist rate that exceeds a threshold blacklist rate.

19. A system comprising:

a datastore storing attribute values of a Website, the attribute values representing characteristics of the Website; and a model integration system coupled to the datastore, the model integration system including at least one processor configured to:

select two or more different models that are each configured to classify the Website based on at least one attribute value of the Website;

provide the at least one attribute value to each of the two or more different models that are configured to classify a Website based on the at least one attribute value;

identify, for a particular model from the two or more different models, one or more additional attributes and corresponding additional attribute values;

provide the identified one or more additional attribute values to the particular model; and assign a final classification to the Website based on classification data received from two or more different models, the classification data received from one of the models specifying, for the Website, a different presentation availability than the classification data received from at least one other model among the two or more different models.

20. The system of claim 19, wherein the model integration system is further operable to retrieve attribute values for the Website based on a Website identifier and provide the attribute values to the two or more different models.

21. The system of claim 19, wherein the model integration system is further operable to select an initial classification as the final classification in response to the initial classification having a confidence factor that meets a highest satisfied threshold confidence factor.

22. The system of claim 19, wherein the model integration system is further operable to monitor an error rate for each of the two or more different models and disable models having an error rate that exceeds a threshold error rate.

23. A computer-implemented method, comprising:

receiving, by a processing device, a request to classify an advertiser Website that is referenced by an advertisement, the request including at least one attribute value representing a characteristic of the Website;

selecting, by a processing device, two or more different models that are each configured to classify the Website based on the at least one attribute value, the two or more different models being selected from a set of models implemented in processing devices in a distributed processing environment, each of the two or more different models being a model having a blacklist rate that is below a threshold blacklist rate, the blacklist rate for each model measuring a rate at which Websites are classified as blacklisted Websites based on classification data provided by the model;

identifying, by a data processing device, additional attribute values that are requested by the two or more different models;

providing, by a processing device, the at least one attribute value to each of the two or more different models;

providing, to each of the two or more different models and by a processing device, the additional attribute values that are requested by the two or more different models;

receiving, by a processing device, classification data from the two or more different models, the classification data including an initial classification score of the Website and a confidence factor specifying a likelihood that an initial classification of the Website based on the classification score is accurate;

comparing, by a processing device, the initial classification score received from the two or more different models to threshold classification scores for Website classifications;

selecting, by a processing device and for each of the two or more different models, an initial classification for the Website based on the classification score for the model meeting a threshold classification score for the Website classifications, the initial classification for one of the models specifying, for the Website, a different presentation availability than the initial classification for at least one other model among the two or more different models;

comparing, by a processing device, the confidence factor received from the two or more different models to threshold confidence factors corresponding to the initial classifications;

assigning, by a processing device, an initial classification having a highest satisfied threshold confidence factor as a final classification for the Website; and preventing, by a processing device, presentation of a Website based on a final classification of the Website.

* * * * *